United States Patent
Bulawa et al.

(10) Patent No.: US 8,877,880 B2
(45) Date of Patent: Nov. 4, 2014

(54) METHOD FOR CONTROLLING POLYOLEFIN PROPERTIES

(75) Inventors: Michael C. Bulawa, Houston, TX (US); Periagaram S. Ravishankar, Kingwood, TX (US); Anthony J. Dias, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 549 days.

(21) Appl. No.: 13/276,054

(22) Filed: Oct. 18, 2011

(65) Prior Publication Data
US 2012/0123069 A1    May 17, 2012

Related U.S. Application Data (60) Provisional application No. 61/414,480, filed on Nov. 17, 2010.

(51) Int. Cl.

| | |
|---|---|
| *C08F 2/00* | (2006.01) |
| *C08F 4/6192* | (2006.01) |
| *C08F 4/76* | (2006.01) |
| *C08F 210/16* | (2006.01) |
| *C08F 210/08* | (2006.01) |
| *C08F 4/6592* | (2006.01) |
| *C08F 4/659* | (2006.01) |

(52) U.S. Cl.
CPC ........... *C08F 210/16* (2013.01); *C08F 4/65927* (2013.01); *C08F 2400/02* (2013.01); *C08F 4/65908* (2013.01)
USPC ............... 526/68; 526/60; 526/129; 526/134; 526/348.6; 526/348.7; 525/51

(58) Field of Classification Search
USPC ............... 526/60, 129, 348.6, 68, 134, 348.7; 525/51, 240
See application file for complete search history.

(56) References Cited

U.S. PATENT DOCUMENTS

| | | | |
|---|---|---|---|
| 3,726,843 | A | 4/1973 | Anolick et al. |
| 3,912,698 | A | 10/1975 | Shurts |
| 4,444,922 | A | 4/1984 | Gutowski et al. |
| 5,599,885 | A | 2/1997 | Kawasaki et al. |
| 6,576,719 | B2 * | 6/2003 | Heritier et al. ................. 526/60 |
| 6,881,800 | B2 | 4/2005 | Friedersdorf |
| 7,163,989 | B2 | 1/2007 | Friedersdorf |
| 2010/0144998 | A1 * | 6/2010 | Santiago-Fernandez et al. .......................... 526/348.6 |

FOREIGN PATENT DOCUMENTS

| | | |
|---|---|---|
| EP | 0 552 945 | 7/1993 |
| WO | WO 92/14766 | 9/1992 |
| WO | WO 94/00500 | 1/1994 |
| WO | WO 98/02471 | 1/1998 |
| WO | WO 2008/140280 A2 * | 11/2008 |

* cited by examiner

*Primary Examiner* — Fred M Teskin (57) ABSTRACT

The invention relates to a method for controlling properties of a polyolefin. More particularly, the invention relates to a method for controlling certain properties of an ethylene-butene copolymer and compositions thereof using isobutylene and/or other $C_4$ components.

20 Claims, 5 Drawing Sheets

Ratio of Butene-1/Isobutylene and Its Effect on MIR

METHOD FOR CONTROLLING POLYOLEFIN PROPERTIES

PRIORITY CLAIM

This application claims priority to U.S. Ser. No. 61/414,480, filed Nov. 17, 2010, the disclosure of which is herein incorporated by reference in its entirety.

CROSS REFERENCE TO RELATED APPLICATION

This application is related to U.S. Pat. No. 7,163,989, which is a continuation of U.S. Pat. No. 6,881,800, the contents of which are incorporated by reference in their entirety.

FIELD OF THE INVENTION

The invention relates to a method for controlling properties of a polyolefin. More particularly, the invention relates to a method for controlling certain properties of an ethylene-butene copolymer and compositions thereof using isobutylene and/or other $C_4$ components.

BACKGROUND OF THE INVENTION

The degree of branching in a polyolefin has various implications in properties relevant to its end use. For example, long chain branching can affect the flexural properties, stiffness, and impact performance of thermoplastic polyolefins (TPOs) which are widely used in the automotive and construction industry due to their advantages in terms of reduced weight, recyclability, and plasticizer migration. Flex-to-stiffness balance affects the impact performance of TPOs, which is an important consideration in automobile applications such as car bumpers. Long chain branching can also influence the microstructure, such as average particle size and distribution, of a TPO (e.g., of ethylene-butene plastomers in a polypropylene matrix). This in turns affects the surface properties of the end product, such as paintability and ease of paint peel-off. While some of these properties can be adjusted by compounding or formulating the polyolefin with certain additives, this approach is less preferred for economic and efficiency reasons.

There is a need for controlling the degree of branching during the polymerization process. Chain transfer agents such as hydrogen are typically added to reaction mixtures to modify the molecular weight and control branching of the polymer. This invention provides a method to control branching in a copolymer and to affect the properties of thermoplastic polyolefin compositions containing the copolymer by controlling the amount of isobutylene and/or other $C_4$ components present during polymerization. This method is particularly advantageous in making copolymers such as ethylene-butene copolymer since isobutylene and the other $C_4$ components typically are already present in commercial supplies of butene (butene-1) and during the reaction process. Traditionally, isobutylene and other $C_4$ components are often purged to avoid buildup in the system resulting from the recycling process. Under a method of this invention, the amount of these materials can be readily controlled to obtain the desired branching level and thermoplastic polyolefin composition properties by adjusting their concentrations in the recycle stream prior to returning to the reaction mixture.

References in the art include U.S. Pat. No. 7,163,989 and those cited therein, U.S. Pat. Nos. 3,726,843; 3,912,698; 4,444,922; 5,599,885; 6,881,800; and EP 0552945; WO 92/14766; WO 94/00500; and WO 98/02471.

SUMMARY OF THE INVENTION

In one embodiment, the invention encompasses a method for controlling a property of an ethylene-butene copolymer, said method comprising: (a) establishing a target property level for an ethylene-butene copolymer, preferably wherein the property is at least one of (i) long chain branching and (ii) Melt Index Ratio; (b) contacting ethylene, butene-1, and isobutylene with a catalyst to form a polymerization mixture in a reaction zone; (c) controlling the amount of isobutylene relative to butene-1 in the reaction zone; and (d) forming an ethylene-butene copolymer having the target property level.

In another embodiment, the invention encompasses a method for controlling a property of an ethylene-butene copolymer, said method comprising: (a) establishing a target property level for an ethylene-butene copolymer, preferably wherein the property is at least one of (i) long chain branching and (ii) Melt Index Ratio; (b) contacting ethylene, butene-1, and other $C_4$ components with a catalyst to form a polymerization mixture in a reaction zone; (c) controlling the amount of the other $C_4$ components relative to ethylene in the reaction zone; and (d) forming an ethylene-butene copolymer having the target property level.

In one embodiment, the invention encompasses a method for controlling a property of a thermoplastic polyolefin composition comprising an ethylene-butene copolymer, said method comprising: (a) establishing a target property level for a thermoplastic polyolefin composition comprising an ethylene-butene copolymer, preferably wherein the property is at least one of (i) flexural modulus, (ii) stiffness, (iii) impact resistance, (iv) average particle size of the ethylene-butene copolymer in the thermoplastic polyolefin composition, and (v) and particle size distribution of the ethylene-butene copolymer in the thermoplastic polyolefin composition; (b) contacting ethylene, butene-1, and isobutylene with a catalyst to form a polymerization mixture in a reaction zone; (c) controlling the amount of isobutylene relative to butene-1 in the reaction zone to effect the target property level for the thermoplastic polyolefin composition comprising an ethylene-butene copolymer; and (d) forming the ethylene-butene copolymer.

In one embodiment, the invention encompasses a method for controlling a property of a thermoplastic polyolefin composition comprising an ethylene-butene copolymer, said method comprising: (a) establishing a target property level for a thermoplastic polyolefin composition comprising an ethylene-butene copolymer, preferably wherein the property is at least one of (i) flexural modulus, (ii) stiffness, (iii) impact resistance, (iv) average particle size of the ethylene-butene copolymer in the thermoplastic polyolefin composition, and (v) and particle size distribution of the ethylene-butene copolymer in the thermoplastic polyolefin composition; (b) contacting ethylene, butene-1, and other $C_4$ components with a catalyst to form a polymerization mixture in a reaction zone; (c) controlling the amount of the other $C_4$ components relative to ethylene in the reaction zone to effect the target property level for the thermoplastic polyolefin composition comprising an ethylene-butene copolymer; and (d) forming the ethylene-butene copolymer.

DETAILED DESCRIPTION OF PREFERRED EMBODIMENTS

Various specific embodiments, versions and examples of the invention will now be described, including preferred embodiments and definitions that are adopted herein for purposes of understanding the claimed invention. While the following detailed description gives specific preferred embodiments, those skilled in the art will appreciate that these embodiments are exemplary only and that the invention can be practiced in other ways. For purposes of determining infringement, the scope of the invention will refer to any one or more of the appended claims, including their equivalents, and elements or limitations that are equivalent to those that are recited. Depending on the context, references below to the "invention" may in some cases refer to certain specific embodiments only. In other cases it will be recognized that references to the "invention" will refer to subject matter recited in one or more, but not necessarily all, of the claims. Headings used herein are for reference only and are not intended to limit any aspect of the invention.

As used herein, the term "polymer" refers to the product of a polymerization reaction, and includes homopolymers, copolymers, terpolymers, etc. The term "copolymer(s)" refers to polymers formed by the polymerization of at least two different monomers. For example, the term "copolymer" includes the copolymerization reaction product of ethylene and an alpha-olefin ($\alpha$-olefin), such as butene. However, the term "copolymer" is also inclusive of, for example, the copolymerization of a mixture of more than two monomers, such as, ethylene-butene-propylene.

It is known that higher reactor temperature and lower monomer conversion encourages the formation of long chain branching. Long chain branching can be measured by phase angle, $\delta$, obtained from oscillatory shear rheometer, and MIR, the melt index ratio obtained by measuring the melt index at two different loads. Generally, the higher the delta or lower the MIR, the more linear the polymer.

This invention provides a method to control branching in a copolymer and to affect the properties of thermoplastic polyolefin compositions containing the copolymer by controlling the amount of isobutylene and/or other $C_4$ components (which may be covariant) during polymerization. "Other $C_4$ components" as used herein refers to 4-carbon components other than butene-1, isobutene, and butane, that are present in the polymerization mixture. The other $C_4$ components are identifiable by a Thermal Conductivity Detector using a Siemens Maxum Edition II analyzer run at a cycle time of 292 seconds. Controlling a polymer's microstructure is important for product quality in terms of consistency, which has a substantial impact on the processing of products containing the polymer.

It is believed that isobutylene reacts with the active catalyst site (similar to a chain transfer agent such as hydrogen), thereby producing a saturated polymer chain end. The saturated end group impedes the polymer from incorporating into another growing chain, which is the mechanism believed to lead to long-chain branching. Thus, it is believed that by controlling the amount of isobutylene present in the polymerization process, especially when relative to the amount of a comonomer (e.g., butene-1, in the case of ethylene-butene), the level of long-chain branching and other properties affected by branching can be controlled.

The same mechanism is expected to apply to polymers other than ethylene-butene copolymer, e.g., a copolymer of ethylene and an alpha-olefin ($\alpha$-olefin), such as propylene, hexene, or octene.

The invention encompasses a method for controlling a property of a polymer, said method comprising: (a) establishing a target property level for a polymer, preferably wherein the property is at least one of (i) long chain branching and (ii) Melt Index Ratio; (b) contacting monomer (and optionally comonomer) units with isobutylene and/or other $C_4$ components, and a catalyst to form a polymerization mixture in a reaction zone; (c) controlling the amount of isobutylene and/or other $C_4$ components, preferably relative to the amount(s) of monomer and/or comonomer, in the reaction zone; and (d) forming the polymer having the target property level. Preferably, the polymer is a copolymer of ethylene and propylene, butene, hexene, or octene. By "establishing" a target property level, it is not necessary that the target be established immediately before the polymerization process so long as there is an existing target level for which the amount of isobutylene and/or other $C_4$ components is controlled.

Isobutylene

In one embodiment, the invention encompasses a method for controlling a property of an ethylene-butene copolymer, said method comprising: (a) establishing a target property level for an ethylene-butene copolymer, preferably wherein the property is at least one of (i) long chain branching and (ii) Melt Index Ratio; (b) contacting ethylene, butene-1, and isobutylene with a catalyst to form a polymerization mixture in a reaction zone; (c) controlling the amount of isobutylene relative to butene-1 in the reaction zone; and (d) forming an ethylene-butene copolymer having the target property level.

In one embodiment, the invention encompasses a method for controlling a property of a thermoplastic polyolefin composition comprising an ethylene-butene copolymer, said method comprising: (a) establishing a target property level for a thermoplastic polyolefin composition comprising an ethylene-butene copolymer, preferably wherein the property is at least one of (i) flexural modulus, (ii) stiffness, (iii) impact resistance, (iv) average particle size of the ethylene-butene copolymer in the thermoplastic polyolefin composition, and (v) and particle size distribution of the ethylene-butene copolymer in the thermoplastic polyolefin composition; (b) contacting ethylene, butene-1, and isobutylene with a catalyst to form a polymerization mixture in a reaction zone; (c) controlling the amount of isobutylene relative to butene-1 in the reaction zone to effect the target property level for the thermoplastic polyolefin composition comprising an ethylene-butene copolymer; and (d) forming the ethylene-butene copolymer.

In one embodiment, step (c) comprises determining the amount of isobutylene in the reaction zone, and adjusting the amount of isobutylene in the reaction zone. In one embodiment, step (c) comprises adding fresh isobutylene to the reaction zone.

The amount of isobutylene relative to the amount of butene-1 in the reaction zone can also be controlled by adjusting the amount of isobutylene and/or butene-1 elsewhere in the polymerization process. In one embodiment, step (c) comprises: (i) separating the polymerization mixture into a concentrated phase and a lean phase, wherein the lean phase comprises isobutylene; (ii) controlling the amount of isobutylene in the lean phase to effect the target property level; and (iii) recycling at least a portion of the lean phase containing isobutylene to the reaction zone. In one embodiment, step (ii) comprises determining the amount of isobutylene in the lean phase, and adjusting the amount of isobutylene in the lean phase.

In one embodiment, step (c) of the method for controlling a property of a thermoplastic polyolefin composition comprising an ethylene-butene copolymer comprises: (i) forming an ethylene-butene copolymer; (ii) forming a thermoplastic polyolefin composition comprising the ethylene-butene copolymer; (iii) determining the property level of the thermoplastic polyolefin composition of step (ii); and (iv) adjusting or maintaining the amount of isobutylene relative to butene-1 based on the property level determined in step (iii) to effect the target property level.

In one embodiment, the amount of isobutylene relative to the amount of butene-1 is controlled such that the ethylene-butene copolymer has at least one of:

(i) a Melt Index Ratio (MIR) value (at $MI_{21.6}/MI_{2.16}$) meeting the following equation:

$$2.85 R_B + 17 \leq MIR \leq 2.85 R_B + 21; \text{ and}$$

(ii) a phase angle $\delta$ (at $|G^*|=50$ kPa) meeting the following equation:

$$63.8(R_B^{-0.0784}) \leq \delta \leq 67.8(R_B^{-0.0784}),$$

where $R_B$ is the ratio by weight of butene-1 to isobutylene in the lean phase.

In one embodiment, $$2.85 R_B + 18 \leq MIR \leq 2.85 R_B + 20, \text{ and preferably}$$

$$MIR \approx 2.85 R_B + 19.$$

In one embodiment, $$64.8(R_B^{-0.0784}) \leq \delta \leq 66.8(R_B^{-0.0784}), \text{ and preferably}$$

$$\delta \approx 65.8(R_B^{0.0784}).$$

Depending on the target property level desired, the ratio by weight of butene-1 to isobutylene in the reaction zone can be, for example, at least about 3, at most about 1.4, or about 1.4 to about 3. Depending on the target property level desired, the ethylene-butene copolymer can have a Melt Index Ratio (at $MI_{21.6}/MI_{2.16}$), for example, of at most about 22, at least about 30, or about 22 to about 30. Also, depending on the target property level desired, the ethylene-butene copolymer can have a $\delta$ (at $|G^*|=50$ kPa), for example, of at least about 64 degrees, at most about 60 degrees, or about 60 to about 64 degrees.

In one embodiment, the invention encompasses a method for controlling a property of an ethylene-butene copolymer, said method comprising: (a) establishing a target property level for an ethylene-butene copolymer; (b) contacting ethylene, butene-1, and isobutylene with a catalyst to form a polymerization mixture of ethylene-butene copolymer in a reaction zone; (c) determining the property level of a sample of the ethylene-butene copolymer; (d) adjusting the amount of isobutylene relative to butene-1 in the reaction zone based on the property level from step (c); and (e) obtaining ethylene-butene copolymer having the target property level, wherein steps (c)-(d) are optionally repeated until the target property level is obtained.

Other $C_4$ Components

In another embodiment, the invention encompasses a method for controlling a property of an ethylene-butene copolymer, said method comprising: (a) establishing a target property level for an ethylene-butene copolymer, preferably wherein the property is at least one of (i) long chain branching and (ii) Melt Index Ratio; (b) contacting ethylene, butene-1, and other $C_4$ components with a catalyst to form a polymerization mixture in a reaction zone; (c) controlling the amount of the other $C_4$ components relative to ethylene in the reaction zone; and (d) forming an ethylene-butene copolymer having the target property level.

The amount of other $C_4$ components relative to the amount of ethylene in the reaction zone can also be controlled by adjusting the amount of other $C_4$ components and/or ethylene elsewhere in the polymerization process. In one embodiment, step (c) comprises: (i) separating the polymerization mixture into a concentrated phase and a lean phase, wherein the lean phase comprises other $C_4$ components; (ii) controlling the amount of the other $C_4$ components in the lean phase to effect the target property level; and (iii) recycling at least a portion of the lean phase containing the other $C_4$ components to the reaction zone. Preferably, step (ii) comprises determining the amount of other $C_4$ components in the lean phase, and adjusting the amount of the other $C_4$ components in the lean phase.

In one embodiment, wherein no other chain transfer agent such as hydrogen is employed, the amount of the other $C_4$ components relative to the amount of ethylene is controlled such that the ethylene-butene copolymer has a Melt Index Ratio (MIR) value (at $MI_{21.6}/MI_{2.16}$) meeting the following equation:

$$39 \, MI^{-0.026} \times \rho^{-2.852} \leq MIR \leq 47 \, MI^{-0.026} \times R_C^{-0.187} \times \rho^{-2.852}$$

where MI is Melt Index (190° C./2.16 kg);
$R_C$ is the ratio by weight of the other $C_4$ components to ethylene in the lean phase multiplied by 1000; and
$\rho$ is the polymer density.

In one embodiment:

$$41 \, MI^{-0.026} \times R_C^{-0.187} \times \rho^{-2.852} \leq MIR \leq 45 \, MI^{-0.026} \times R_C^{-0.187} \times \rho^{-2.852}, \text{ and preferably } MIR \approx 43 \, MI^{-0.026} \times R_C^{-0.187} \times \rho^{-2.852}.$$

In one embodiment, wherein other chain transfer agent such as hydrogen is employed, the amount of the other $C_4$ components relative to the amount of ethylene is controlled such that the ethylene-butene copolymer has a Melt Index Ratio (MIR) value (at $MI_{21.6}/MI_{2.16}$) meeting the following equation:

$$36 \times MI^{-0.038} \times R_C^{-0.076} \times R_h^{-0.037} \leq MIR \leq 44 \times MI^{-0.038} \times R_C^{-0.076} \times R_h^{-0.037}$$

where MI is Melt Index (190° C./2.16 kg);
$R_C$ is the ratio by weight of the other $C_4$ components to ethylene in the lean phase multiplied by 1000; and
$R_h$ is the ratio by weight of hydrogen to ethylene in the reactor feed multiplied by 1,000,000.

In one embodiment, $$38 \times MI^{-0.038} \times R_C^{-0.076} \times R_h^{-0.037} \leq MIR \leq 42 \times MI^{-0.038} \times R_C^{-0.076} \times R_h^{-0.037}, \text{ and preferably, } MIR \approx 40 \times MI^{-0.038} \times R_C^{-0.076} \times R_h^{-0.037}.$$

The ratio by weight of the other $C_4$ components to ethylene in the lean phase after step (c) can be at least about 0.2, at least about 0.5, or at least about 1, depending on the target property level desired.

In one embodiment, the invention encompasses a method for controlling a property of a thermoplastic polyolefin composition comprising an ethylene-butene copolymer, said method comprising: (a) establishing a target property level for a thermoplastic polyolefin composition comprising an ethylene-butene copolymer, preferably wherein the property is at least one of (i) flexural modulus, (ii) stiffness, (iii) impact resistance, (iv) average particle size of the ethylene-butene copolymer in the thermoplastic polyolefin composition, and (v) and particle size distribution of the ethylene-butene copolymer in the thermoplastic polyolefin composition; (b) contacting ethylene, butene-1, and other $C_4$ components with a catalyst to form a polymerization mixture in a reaction zone; (c) controlling the amount of the other $C_4$ components relative to ethylene in the reaction zone to effect the target property level for the thermoplastic polyolefin composition comprising an ethylene-butene copolymer; and (d) forming the ethylene-butene copolymer.

In one embodiment, step (c) of the method for controlling a property of a thermoplastic polyolefin composition comprising an ethylene-butene copolymer comprises: (i) forming an ethylene-butene copolymer; (ii) forming a thermoplastic polyolefin composition comprising the ethylene-butene copolymer; (iii) determining the property level of the thermoplastic polyolefin composition of step (ii); and (iv) adjusting or maintaining the amount of the other $C_4$ components relative to ethylene based on the property level determined in step (iii) to effect the target property level.

In one embodiment, the invention encompasses a method for controlling a property of an ethylene-butene copolymer, said method comprising: (a) establishing a target property level for an ethylene-butene copolymer; (b) contacting ethylene, butene-1, and isobutylene with a catalyst to form a polymerization mixture of ethylene-butene copolymer in a reaction zone; (c) determining the property level of a sample of the ethylene-butene copolymer; (d) adjusting the amount of other $C_4$ components relative to ethylene in the reaction zone based on the property level from step (c); and (e) obtaining ethylene-butene copolymer having the target property level, wherein steps (c)-(d) are optionally repeated until the target property level is obtained.

It is contemplated that each of the above embodiments described with respect to ethylene-butene copolymer may be applied to other polymers, such as a copolymer of ethylene with propylene, hexene, or octene, by controlling the amount of isobutylene and/or other $C_4$ components.

Polymerization Process

The invention is not limited to any particular polymerization process. A process for making ethylene-butene copolymer is exemplified with reference to FIG. 1. Further details may be found, e.g., in U.S. Pat. No. 7,163,989, incorporated herein by reference in its entirety.

Polymerization and Initial Separation of Polymer and Solvent

Figure 1:
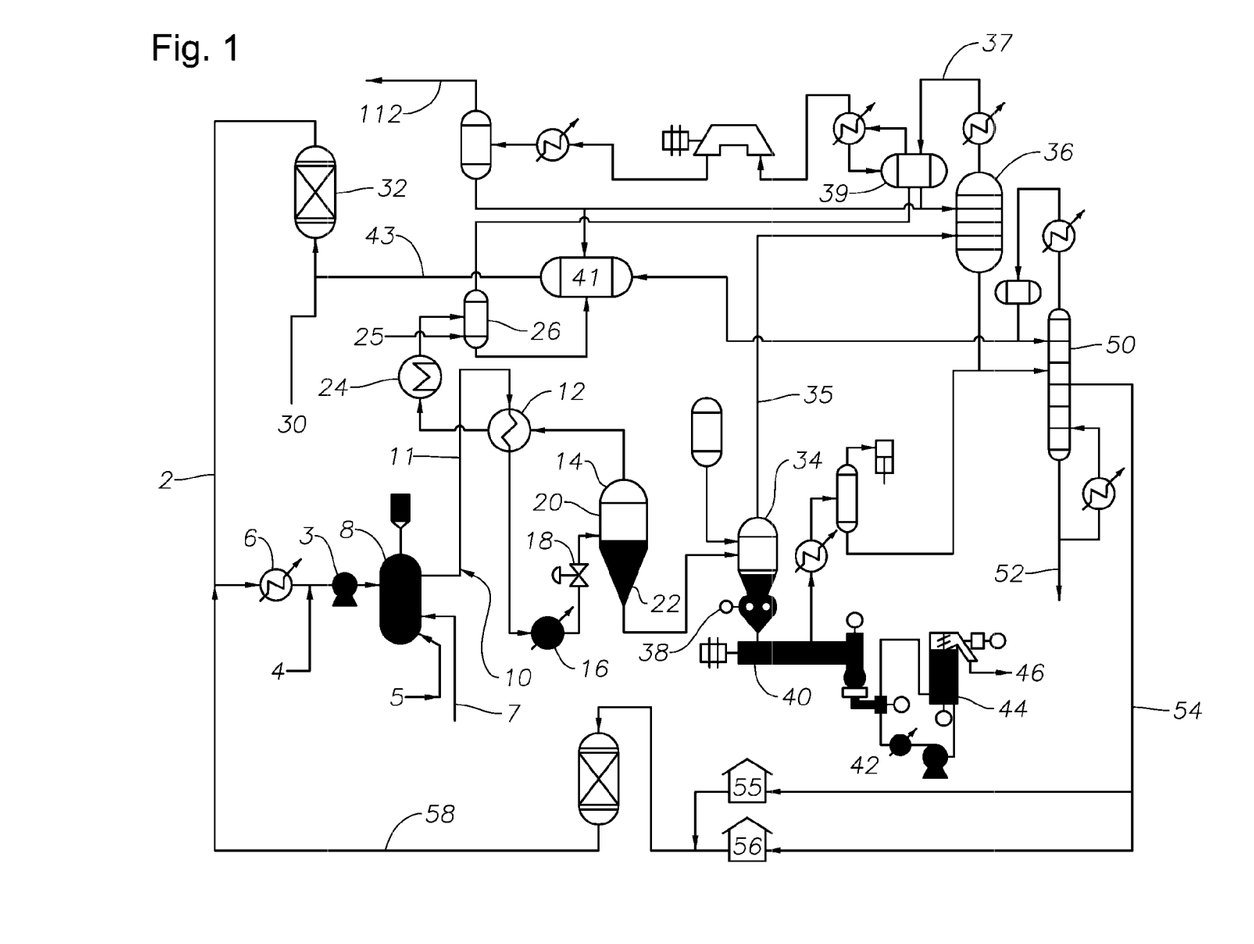
FIG. 1 illustrates a process for making a copolymer.

A feed for polymerization is passed through conduit (2) by a centrifugal pump (3). The feed contains A) hexane, preferably isohexane, as solvent, B) ethylene monomer, and C) butene monomer, including isobutylene and butene-1. The feed is passed through a chiller or cooler (6) in which the feed is optionally chilled to a low temperature for subsequent adiabatic polymerization in one or two continuous stirred tank reactors (8) which are operated in series (for simplicity, only one reactor is depicted in FIG. 1). Activator and metallocene catalyst may be premixed and added at (5) and/or (7) to one or both reactors (8). A scavenger, generally in the form of an alkyl aluminum such as tri-isobutyl aluminum or tri-n-octyl aluminum may be added at (4) to minimize the impact of poisons in the feed and in the reactor on the catalyst activity. Attached to the reactors (8) may be a chemical analysis unit to determine the concentrations of isobutylene, butene-1, and other $C_4$ components in the reactors (8).

To complement the long chain branching control by modifying the amount of isobutylene and/or other $C_4$ components in the reaction zone, hydrogen may be added to one or both reactors through conduits (not shown) to control the molecular weight.

The solution, containing polymer, which emerges from the reactors (8) through a conduit (11), is first treated with a catalyst killer, preferably water, added at (10) in a molecular solution in hexane solvent to terminate the polymerization reaction. A heat exchanger (12) is arranged as part of a heat integrating arrangement and heated by a lean phase emerging from an upper layer (20) in a liquid phase separator (14), and provides an initial increase in the temperature of the polymer solution in the conduit (11). A trim heat exchanger (16), operating by using steam, hot oil or other high temperature fluid, further increases the temperature to a level suitable for liquid phase separation. The solution then passes through a let down valve (18) where a pressure drop is created which causes the separation of the polymer solution and settlement into the lean phase (20) and a polymer rich phase (22) below it.

An energy consuming pump may be used, but is not required to provide a pressure increase in the conduit (11) between the reactors (8) and the separator (14), as the polymer containing solution is propelled by the pressure from the pump (3).

Treatment of Lean Phase

The amount of isobutylene and/or other $C_4$ components in the reactor (8) can be controlled by controlling the amount of isobutylene and/or other $C_4$ components in the lean phase, and/or by controlling the amount of the lean phase being recycled back to the reactor. This can be achieved by purging isobutylene and/or other $C_4$ components from the lean phase and recycling the lean phase back to the reactor (8), or recycling only a portion of the lean phase back to the reactor (8).

The lean phase (20), after being cooled by the heat exchanger (12), is cooled further by a cooling device (24), passed through a surge tank (26) adapted for stripping out the hydrogen (if hydrogen is added), and then submitted to in-line chemical analysis unit at (41) to determine the concentrations of monomer (ethylene) and comonomer (butene) in the solvent.

The same in-line chemical analysis unit (41) or a separate analysis unit can be used to determine the concentration of isobutylene or other $C_4$ components in the lean phase. The concentration of isobutylene or other $C_4$ components in the lean phase is then used to determine (i) what portion of the lean phase is to be recycled back to the reactor (8), and/or (ii) how much isobutylene or other $C_4$ components needs to be purged before recycling the lean phase back to the reactor (8).

The amount of isobutylene in the reactor (8) also can be controlled by adding fresh isobutylene to the reactor (8); however, this is less preferred compared to utilizing existing isobutylene in the lean phase.

This cooled lean phase is combined with fresh feed (30) of solvent and ethylene, butene, and/or isobutylene (which may be present as part of the butene supplied) to provide the desired concentrations in the reactor (8). The stream is then passed through a drier (32) which serves to remove any unreacted water used as the catalyst killer or present in the fresh feed supplied or any unwanted impurity in the recycled solvent and monomer.

Isobutylene and Other $C_4$ Components

The amount of butene-1, isobutylene, ethylene, and other $C_4$ components in the reactor (8) during the polymerization process (including the recycle process) can be continuously monitored via an attached chemical analysis unit, or by periodically obtaining and testing samples taken from the reactor. This data can be used in conjunction with data from the chemical analysis unit (41) (or a separate analysis unit) on the concentrations of isobutylene and other $C_4$ components in the lean phase to determine the amounts of isobutylene and/or other $C_4$ components to be sent back to the reactor in order obtain the desired level of long chain branching.

By adjusting the ratio of the isobutylene to butene-1 and/or the ratio of the other $C_4$ components to ethylene in the reactor (8), the level of long chain branching as reflected by the MIR of the resulting polymer product can be readily controlled. It has been observed that generally, the greater the ratio of isobutylene : butene-1, the more linear the polymer, e.g., a ethylene-butene copolymer, will be, as evidenced by a lower MIR and higher delta. Also, generally speaking, the greater the ratio of other $C_4$ components to ethylene, the lower the MIR and thus more linear the polymer will be.

These relationships can be applied toward controlling certain properties of thermoplastic polyolefin compositions by controlling the level of long chain branching in the copolymer. For example, properties affected by the degree of branching include the flexural modulus, stiffness, and impact resistance of the thermoplastic polyolefin composition. See, e.g., Dharmarajan et al., "High Flow TPO Compounds Containing Branched EP(D)M Modifiers," presented at American Chemical Society, Oct. 21-24, 1997. Other properties that can be controlled by controlling the level of long chain branching include average particle size and particle size distribution of the ethylene-butene copolymer in the thermoplastic polyolefin composition. Thus, by determining and adjusting the concentrations of isobutylene and/or the other $C_4$ components during polymerization, one can control a number of properties of thermoplastic polyolefin compositions. The specific relationships between the concentrations of these components and the resulting properties depend on other components present in the thermoplastic polyolefin composition and can determined by experimentation; the key is to recognize isobutylene and other $C_4$ components as agents for controlling the level of long chain branching and other properties affected by long chain branching.

Treatment of Polymer Rich Phase

The concentrated polymer rich phase is passed to a low-pressure separator (34) where evaporated solvent and monomer are separated from the more concentrated polymer solution emerging from the liquid phase separator (14). A gear pump (38) may convey the concentrated polymer to a vacuum devolatilizing extruder (40) where the polymer melt emerging from (40) can then be pelletized in an underwater pelletizer, fed with water chilled at (42), washed and spun dried at (44) to form pellets suitable for bagging or baling at (46). The vapor phase that is drawn off from extruder (40) can be conveyed to a purification tower (50). A heavy fraction of toluene (52) used as catalyst solvent and any comonomers used is recovered by this purification tower (50). The comonomers can be recycled through outlet (54), where heavy comonomers, such as ENB and octene, can be stored in separate storage vessels (55) and (56). The comonomers, such as ENB and octene, may then be recycled from storage vessels (55) and (56) through conduit (58) to feed the chiller or cooler (6) for the polymerization reactor (8).

The evaporated solvent and monomer phase is passed through conduit (35) in a vapor phase to the purification tower (36) operating by distillation to separate a light fraction of the highly volatile solvent and unreacted ethylene and butene on the one hand and heavier less volatile components such as hexane and any toluene used to dissolve catalyst or activator and unreacted diene type comonomers on the other hand. Use of toluene can be reduced under appropriate circumstances by a suitable selection of catalyst components and catalyst preparation conditions such as increases in catalyst solution temperature to increase the solubility of the catalyst components to reach a point where so little toluene is present that no separate process for the removal of the toluene are required. The light fraction may pass from the purification tower (36) through conduit (37) to reflux drum (39). The part mainly comprising hydrogen and any other non-condensables may be flared at (112).

Process Conditions for Making Ethylene-Butene Plastomer

To make an ethylene-butene plastomer according to FIG. 1, the feed temperature is reduced by the chiller (6) to 0° C. Aluminum alkyl is added as scavenger in amounts appropriate to the poison content of the feed. Alternatively the process of WO 97/22635 (Turner et al.) incorporated herein in its entirety. The pressure is raised by the centrifugal pump to 120 bar (12 Mpa). The feed comprising largely solvent and up to 50 bar (5 Mpa) partial pressure of ethylene and butene (and optionally, e.g., hexene or octene) comonomer then enters the first of the two series reactors (8). Catalyst and activator is added to the reactor (8) in amounts to create the desired polymerization temperature which in turn is related to the desired molecular weight. The heat of polymerization increases the temperature to 130° C. to 180° C. to form a plastomer without the use of hydrogen (although $H_2$ may be used). At the outlet of the reactor, the polymer concentration is in the range of from 10-22 wt %. The general conditions may be as described in WO 99/45041 incorporated herein.

Water or other agents containing a hydroxyl group is then supplied at (10) to kill the polymerization reaction which might otherwise continue in the presence of surviving catalyst, unreacted monomer, and elevated temperature.

Inside the separator (14) an upper lean phase is formed with less than 0.1 wt % of polymer and a lower polymer rich phase with 30 wt % to 40 wt % of polymer. The concentration is approximately double to triple that of the polymerization mixture fed to the separator (14). After further removal of solvent and monomer in the low-pressure separator (34) and the extruder (40), polymer can be removed from the plant containing less than 1 wt %, preferably with 0.3 wt % or less, even more preferably <0.1 wt % of volatiles, including water.

Ethylene-Butene Copolymer

The ethylene-butene copolymer may comprise ethylene in an amount of at least about 50 wt %, at least about 60 wt %, preferably about 60 wt % to about 80 wt %, and preferably about 65 wt % to about 75 wt %.

The ethylene-butene copolymer may comprise butene in an amount of about 10 wt % to about 50 wt %, preferably about 20 wt % to about 40 wt %, and preferably about 25 wt % to about 35 wt %.

Optionally, the ethylene-butene copolymer may include a third monomer, which may be a $C_3$ or $C_{5-10}$ alpha-olefin. If included, the third monomer may be present in an amount of about 0.01 wt % to about 30 wt %, about 3 wt % to about 20 wt %, or about 1 wt % to about 10 wt %.

In one embodiment, the ethylene-butene copolymer has a weight average molecular weight of about 50,000 to about 500,000, preferably about 60,000 to about 300,000, and preferably about 80,000 to about 200,000.

In one embodiment, the ethylene-butene copolymer has a Melt Index (190° C./2.16 kg) of about 0.1 to about 100 g/10 min, preferably 0.3 to about 50 g/10 min, and preferably about 0.4 to about 10 g/10 min.

In one embodiment, the ethylene-butene copolymer has a density of about 0.850 to about 0.905 g/cm$^3$, preferably about 0.855 to about 0.885 g/cm$^3$, and preferably about 0.860 to about 0.880 g/cm$^3$.

Catalyst and Cocatalyst

The catalyst used in this invention may be a single sited catalyst ("SSC"). These generally contain a transition metal of Groups 3 to 10 of the Periodic Table; and at least one ancillary ligand that remains bonded to the transition metal during polymerization. Preferably the transition metal is used in a cationic state and stabilized by a cocatalyst or activator. Especially preferred are metallocenes of Group 4 of the Periodic table such as titanium, hafnium or zirconium which are used in polymerization in the $d^0$ mono-valent cationic state and have one or two ancillary ligands.

Preferably, the methods of the invention comprise contacting ethylene, butene-1, and isobutylene with a catalyst and a co-catalyst. Preferably, the catalyst is 1, 1'-bis(4-triethylsilylphenyl)methylene-(cyclopentadienyl)(2,7-di-tertiary-butyl-9-fluorenyl) hafnium dimethyl, and the co-catalyst is dimethylaniliniumtetrakis(pentafluorophenyl) borate.

The metallocene may be also be used with a cocatalyst which is a non- or weakly coordinated anion. The term "non-coordinating anion" as used herein includes weakly coordinated anions. The coordination should be sufficiently weak in any event, as evidenced by the progress of polymerization, to permit the insertion of the unsaturated monomer component. The non-coordinating anion may be supplied and reacted with the metallocene in any of the manners described in the art.

Representative non-metallocene transition metal compounds usable as SSC's also include tetrabenzyl zirconium, tetra bis(trimethylsiylmethyl)zirconium, oxotris(trimethlsilylmethyl)vanadium, tetrabenzyl hafnium, tetrabenzyl titanium, bis(hexamethyl disilazido)dimethyl titanium, tris(trimethyl silyl methyl)niobium dichloride, and tris(trimethylsilylmethyl)tantalum dichloride.

More preferred, are metallocenes which are biscyclopentadienyl derivatives of a Group IV transition metal, preferably zirconium or hafnium. See ExxonMobil WO 99/41294. These may advantageously be derivatives containing a fluorenyl ligand and a cyclopentadienyl ligand connected by a single carbon and silicon atom. See ExxonMobil WO 99/45040 and WO 99/45041. Most preferably, the Cp ring is unsubstituted and/or the bridge contains alkyl substituents, suitably alkylsilyl substituents to assist in the alkane solubility of the metallocene. See WO 00/24792 and WO 00/24793. Other possible metallocenes include those in WO 01/58912.

Dow EP 418044 uses a monocyclopentadienyl compound similar that that EP 416815. Similar compounds are described in ExxonMobil EP 420436. Sumitomo WO 97/03992 shows a catalyst in which a single Cp species and a phenol are linked by a C or Si linkage, such as Me2C(Cp)(3-tBu-5-Me-2-phenoxy)TiCl2. Nova WO 2001/05849 discloses Cp-phosphinimine catalysts, such as (Cp)((tBu)3P=N—)TiCl2.

Other suitable metallocenes may be bisfluorenyl derivatives or unbridged indenyl derivatives which may be substituted at one or more positions on the fused ring with moieties which have the effect of increasing the molecular weight and so indirectly permit polymerization at higher temperatures such as described in EP 693506 and EP 780395.

When using the catalysts of the invention, the total catalyst system will generally additionally comprise one or more organometallic compounds as scavenger. Such compounds as used in this application are meant to include those compounds effective for removing polar impurities from the reaction environment and for increasing catalyst activity. Impurities can be inadvertently introduced with any of the polymerization reaction components, particularly with solvent, monomer and catalyst feed, and adversely affect catalyst activity and stability. It can result in decreasing or even elimination of catalytic activity, particularly when ionizing anion pre-cursors activate the catalyst system. The impurities, or catalyst poisons include water, oxygen, polar organic compounds, metal impurities, etc. Preferably steps are taken to remove these poisons before introduction of such into the reaction vessel, for example by chemical treatment or careful separation techniques after or during the synthesis or preparation of the various components, but some minor amounts of organometallic compound will still normally be used in the polymerization process itself.

Typically these compounds will be organometallic compounds such as the Group-13 organometallic compounds of U.S. Pat. Nos. 5,153,157, 5,241,025, and WO-A-91/09882; WO-A-94/03506; WO-A-93/14132; and that of WO 95/07941. Exemplary compounds include triethyl aluminum, triethyl borane, tri-isobutyl aluminum, tri-n-octyl aluminum, methylalumoxane, and isobutyl alumoxane. Alumoxane also may be used in scavenging amounts with other means of activation, e.g., methylalumoxane and tri-isobutyl-aluminoxane with boron-based activators. The amount of such compounds to be used with catalyst compounds of the inventions is minimized during polymerization reactions to that amount effective to enhance activity (and with that amount necessary for activation of the catalyst compounds if used in a dual role) since excess amounts may act as catalyst poisons.

Test Methods

Phase angle δ and complex viscosity is determined by ASTM D6204, Rubber Processibility Analyzer RPA 2000 (Alpha Technologies), set at 100° C., 13.95% strain, frequency sweep 0.21 to 209 rad/sec. The analysis of data is predicated on the use of the Van Gurp-Palmen plots (the phase angle, $\delta(=\tan-1(G''/G''))$), plotted against the absolute value of the dynamic complex modulus, $|G^*|=(G'^2+G''^2)^{1/2}$). From this plot, the value of δ at $|G^*|=50$ kPa is recorded, and the amount of LCB inversely correlates with such value of δ.

Melt Index (MI) is determined by ASTM D1238, Gottfert MI-3 set at 190° C.

Melt Index Ratio (MIR), $MI_{21.6}/MI_{2.16}$ as used in the examples, is determined using the same conditions for MI, using 2.16 kg load.

Stress and strain were determined by ASTM D638, Instron 5566 with a strain rater of 20"/min, type IV specimen prepared by melt mixing pellets into a mass at 120° C. and compression molded at 350° C. into a 6" by 6" pad per ASTM D4703, cooling at 15° C., followed by a 40 hour anneal, prior to testing.

Density is determined on undusted pellets by modified ASTM D1505, at 23° C. The modification involves using a polymer strand obtained at the end of an MI test instead of using compression molded plaques as required by the ASTM test.

Further embodiments of compositions and methods for making the same are provided:

1. A method for controlling a property of an ethylene-butene copolymer, said method comprising:
   (a) establishing a target property level for an ethylene-butene copolymer;
   (b) contacting ethylene, butene-1, and isobutylene with a catalyst to form a polymerization mixture in a reaction zone;
   (c) controlling the amount of isobutylene relative to butene-1 in the reaction zone; and
   (d) forming an ethylene-butene copolymer having the target property level.

2. The method of embodiment 1, wherein step (c) comprises: separating the polymerization mixture into a concentrated phase and a lean phase, wherein the lean phase comprises isobutylene;
   (ii) controlling the amount of isobutylene in the lean phase to effect the target property level; and
   (iii) recycling at least a portion of the lean phase containing isobutylene to the reaction zone.
3. The method of embodiment 1 or 2, wherein step (ii) comprises determining the amount of isobutylene in the lean phase, and adjusting the amount of isobutylene in the lean phase.
4. The method of any of embodiments 1-3, wherein step (c) comprises determining the amount of isobutylene in the reaction zone, and adjusting the amount of isobutylene in the reaction zone based on the property level from step (c).
5. The method of any of embodiments 1-4, wherein step (c) comprises adding fresh isobutylene to the reaction zone.
6. The method of any of embodiments 1-5, wherein the property is at least one of long chain branching and Melt Index Ratio.
7. The method of embodiment 2, wherein the amount of isobutylene relative to the amount of butene-1 is controlled such that the ethylene-butene copolymer has at least one of:
   (i) a Melt Index Ratio (MIR) value (at $MI_{21.6}/MI$) meeting the following equation:

$$2.85\ R_B + 17 \leq MIR \leq 2.85\ R_B + 21;\ \text{and}$$

(ii) a phase angle δ (at $|G^*|=50$ kPa) meeting the following equation:

$$63.8(R_B^{-0.0784}) \leq \delta \leq 67.8(R_B^{-0.0784}),$$

where $R_B$ is the ratio by weight of butene-1 to isobutylene in the lean phase.
8. The method of embodiment 7, where $2.85\ R_B + 18 \leq MIR \leq 2.85\ R_B + 20$.
9. The method of embodiment 7, where $MIR \cong 2.85\ R_B + 19$.
10. The method of embodiment 7, where $64.8(R_B^{-0.0784}) \leq \delta \leq 66.8(R_B^{-0.0784})$.
11. The method of embodiment 7, where $\delta \cong 65.8(R_B^{-0.0784})$.
12. The method of embodiment 1, wherein the ratio by weight of butene-1 to isobutylene in the lean phase is at least about 3.
13. The method of embodiment 1, wherein the ratio by weight of butene-1 to isobutylene in the lean phase is at most about 1.4.
14. The method of embodiment 1, wherein the ratio by weight of butene-1 to isobutylene in the lean phase is about 1.4 to about 3.
15. The method of any of embodiments 12-14, wherein the ethylene-butene copolymer has a Melt Index Ratio (at $MI_{21.6}/MI$) of at most about 22.
16. The method of any of embodiments 12-14, wherein the ethylene-butene copolymer has a Melt Index Ratio (at $MI_{21.6}/MI$) of at least about 30.
17. The method of any of embodiments 12-14, wherein the ethylene-butene copolymer has a Melt Index Ratio (at $MI_{21.6}/MI$) of about 22 to about 30.
18. The method of any of embodiments 12-17, wherein the ethylene-butene copolymer has a δ (at $|G^*|=50$ kPa) of at least about 64 degrees.
19. The method of any of embodiments 12-17, wherein the ethylene-butene copolymer has a δ (at $|G^*|=50$ kPa) of at most about 60 degrees.
20. The method of any of embodiments 12-17, wherein the ethylene-butene copolymer has a δ (at $|G^*|=50$ kPa) of about 60 to about 64 degrees.
21. The method of any of embodiments 12-20, wherein the ethylene-butene copolymer comprises butene in an amount of about 10 wt % to about 50 wt %.
22. The method of any of embodiments 12-20, wherein the ethylene-butene copolymer comprises butene in an amount of about 20 wt % to about 40 wt %.
23. The method of any of embodiments 12-20, wherein the ethylene-butene copolymer comprises butene in an amount of about 25 wt % to about 35 wt %.
24. The method of embodiment 1, wherein the ethylene-butene copolymer has a weight average molecular weight of about 50,000 to about 500,000.
25. The method of embodiment 24, wherein the ethylene-butene copolymer has a Melt Index (190° C./2.16 kg) of about 0.1 to about 100 g/10 min.
26. The method of any of embodiments 24 or 25, wherein the ethylene-butene copolymer has a Melt Index (190° C./2.16 kg) of about 0.3 to about 50 g/10 min.
27. The method of any of embodiments 24-26, wherein the ethylene-butene copolymer has a Melt Index (190° C./2.16 kg) of about 0.4 to about 10 g/10 min.
28. The method of any of embodiments 24-27, wherein the ethylene-butene copolymer has a density of about 0.850 to about 0.905 g/cm$^3$.
29. The method of any of embodiments 24-27, wherein the ethylene-butene copolymer has a density of about 0.855 to about 0.885 g/cm$^3$.
30. The method of any of embodiments 24-27, wherein the ethylene-butene copolymer has a density of about 0.860 to about 0.880 g/cm$^3$.
31. The method of embodiment 1, wherein the catalyst is an organometallic Group IV transition metal compound comprising two cyclopentadienyl ligands covalently bridged by a substituted or unsubstituted carbon atom or a substituted or unsubstituted silicon atom.
32. The method of embodiment 1, wherein the catalyst is 1,1'-bis(4-triethylsilylphenyl)methylene-(cyclopentadienyl)(2,7-di-tertiary-butyl-9-fluorenyl)hafnium dimethyl.
33. The method of embodiment 31 or 32, further comprising contacting with a co-catalyst in step (b).
34. The method of any of embodiments 31-33, wherein the co-catalyst is at least one of dimethylaniliniumtetrakis (pentafluorophenyl)borate and dimethylaniliniumtetrakis (hepta-fluoronapthyl)borate.
35. A method for controlling a property of an ethylene-butene copolymer, said method comprising:
    (a) establishing a target property level for an ethylene-butene copolymer;
    (b) contacting ethylene, butene-1, and other C$_4$ components with a catalyst to form a polymerization mixture in a reaction zone;
    (c) controlling the amount of other C$_4$ components relative to ethylene in the reaction zone; and
    (d) forming an ethylene-butene copolymer having the target property level.
36. The method of embodiment 35, wherein step (c) comprises:
    (i) separating the polymerization mixture into a concentrated phase and a lean phase, wherein the lean phase comprises other C$_4$ components;
    (ii) controlling the amount of the other C$_4$ components in the lean phase to effect the target property level; and
    (iii) recycling at least a portion of the lean phase containing the other C$_4$ components to the reaction zone.
37. The method of embodiment 35 or 36, wherein step (ii) comprises determining the amount of other C$_4$ components in the lean phase, and adjusting the amount of the other $C_4$ components in the lean phase.

38. The method of any of embodiments 35-37, wherein the property is at least one of long chain branching and Melt Index Ratio.

39. The method of embodiment 36, wherein no other chain transfer agent such as hydrogen is employed, and the amount of the other $C_4$ components relative to the amount of ethylene is controlled such that the ethylene-butene copolymer has a Melt Index Ratio (MIR) value (at $MI_{21.6}/MI_{2.16}$) meeting the following equation:

$$39\, MI^{-0.026} \times R_C^{-0.187} \times \rho^{-2.852} \leq MIR \leq 47\, MI^{-0.026} \times R_C^{-0.187} \times \rho^{-2.852}$$

where MI is Melt Index (190° C./2.16 kg);
$R_C$ is the ratio by weight of the other $C_4$ components to ethylene in the lean phase multiplied by 1000; and
$\rho$ is the polymer density.

40. The method of embodiment 39, where $$41\, MI^{-0.026} \times R_C^{-0.187} \times \rho^{-2.852} \leq MIR \leq 45\, MI^{-0.026} \times R_C^{-0.187} \times \rho^{-2.852}.$$

41. The method of embodiment 36, wherein another chain transfer agent such as hydrogen is employed, and the amount of the other $C_4$ components relative to the amount of ethylene is controlled such that the ethylene-butene copolymer has a Melt Index Ratio (MIR) value (at $MI_{21.6}/MI_{2.16}$) meeting the following equation:

$$36 \times MI^{-0.038} \times R_C^{-0.076} \times R_h^{-0.037} \leq MIR \leq 44 \times MI^{0.038} \times R_C^{-0.076} \times R_h^{-0.037}$$

where MI is Melt Index (190° C./2.16 kg);
$R_C$ is the ratio by weight of the other $C_4$ components to ethylene in the lean phase multiplied by 1000; and
$R_h$ is the ratio by weight of hydrogen to ethylene in the reactor feed multiplied by 1,000,000.

42. The method of any of embodiments 35-41, wherein the ratio by weight of the other $C_4$ components to ethylene in the reaction zone after step (c) is at least about 0.2.

43. The method of any of embodiments 35-41, wherein the ratio by weight of the other $C_4$ components to ethylene in the reaction zone after step (c) is at least about 0.5.

44. The method of any of embodiments 35-41, wherein the ratio by weight of the other $C_4$ components to ethylene in the reaction zone after step (c) is at least about 1.

45. A method for controlling a property of a thermoplastic polyolefin composition comprising an ethylene-butene copolymer, said method comprising:
(a) establishing a target property level for a thermoplastic polyolefin composition comprising an ethylene-butene copolymer, wherein the property is at least one of (i) flexural modulus, (ii) stiffness, (iii) impact resistance, (iv) average particle size of the ethylene-butene copolymer in the thermoplastic polyolefin composition, and (v) and particle size distribution of the ethylene-butene copolymer in the thermoplastic polyolefin composition;
(b) contacting ethylene, butene-1, and isobutylene with a catalyst to form a polymerization mixture in a reaction zone;
(c) controlling the amount of isobutylene relative to butene-1 in the reaction zone to effect the target property level for the thermoplastic polyolefin composition; and
(d) forming the ethylene-butene copolymer.

46. The method of embodiment 45, wherein step (c) comprises:
(i) determining the amount of isobutylene in the reaction zone;
(ii) forming an ethylene-butene copolymer;
(iii) forming a thermoplastic polyolefin composition comprising the ethylene-butene copolymer;
(iv) determining the property level of the thermoplastic polyolefin composition of step (iii); and
(v) adjusting or maintaining the amount of isobutylene relative to butene-1 in the reaction zone based on the property level determined in step (iv) to effect the target property level.

47. A method for controlling a property of a thermoplastic polyolefin composition comprising an ethylene-butene copolymer, said method comprising:
(a) establishing a target property level for a thermoplastic polyolefin composition comprising an ethylene-butene copolymer, wherein the property is at least one of (i) flexural modulus; (ii) stiffness; (iii) impact resistance; (iv) average particle size of the ethylene-butene copolymer in the thermoplastic polyolefin composition; and (v) particle size distribution of the ethylene-butene copolymer in the thermoplastic polyolefin composition;
(b) contacting ethylene, butene-1, and other $C_4$ components with a catalyst to form a polymerization mixture in a reaction zone;
(c) controlling the amount of the other $C_4$ components relative to ethylene in the reaction zone to effect the target property level for the thermoplastic polyolefin composition; and
(d) forming the ethylene-butene copolymer.

48. A method for controlling a property of an ethylene-butene copolymer, said method comprising:
(a) establishing a target property level for an ethylene-butene copolymer;
(b) contacting ethylene, butene-1, and isobutylene with a catalyst to form a polymerization mixture of ethylene-butene copolymer in a reaction zone;
(c) determining the property level of a sample of the ethylene-butene copolymer;
(d) adjusting the amount of isobutylene relative to butene-1 in the reaction zone based on the property level from step (c); and
(e) obtaining ethylene-butene copolymer having the target property level, wherein steps (c)-(d) are optionally repeated until the target property level is obtained.

49. A method for controlling a property of an ethylene-butene copolymer, said method comprising:
(f) establishing a target property level for an ethylene-butene copolymer;
(g) contacting ethylene, butene-1, and isobutylene with a catalyst to form a polymerization mixture of ethylene-butene copolymer in a reaction zone;
(h) determining the property level of a sample of the ethylene-butene copolymer;
(i) adjusting the amount of other $C_4$ components relative to ethylene in the reaction zone based on the property level from step (h); and
(j) obtaining ethylene-butene copolymer having the target property level, wherein steps (c)-(d) are optionally repeated until the target property level is obtained.

50. An ethylene-butene copolymer made by the method of embodiment 1.

51. A thermoplastic polyolefin comprising the ethylene-butene copolymer prepared by the method of embodiment 1.

52. An ethylene-butene copolymer made by the method of embodiment 35.

53. A thermoplastic polyolefin comprising the ethylene-butene copolymer prepared by the method of embodiment 35.

54. A thermoplastic polyolefin made by the method of embodiment 45.

EXAMPLES

Effect of Isobutylene on MIR and Phase Angle

Four ethylene-butene copolymer product runs were conducted in the course of two campaigns. Samples were taken from the lean phase recycle vapor, and the ratios of butene-1:isobutylene and the MIR and phase angle ($\delta$) were determined.

TABLE 1

Effect of Butene-1/Isobutylene Ratio and MIR and Phase Angle

| Product Run | Sample | Butene-1/ Isobutylene | MIR ($MI_{21.6}/MI_{2.16}$) | $\delta$ $\lvert G^*\rvert = 50$ kPa |
|---|---|---|---|---|
| 1 | a | 2.81 | 26.9 | 60.5 |
|   | b | 1.76 | 25.0 | 62.3 |
|   | c | 2.33 | 25.7 | 61.8 |
| 2 | a | 1.82 | 24.4 | 63.2 |
| 3 | a | 1.38 | 23.2 | 64.3 |
| 4 | a | 1.63 | 22.8 | 63.0 |
|   | b | 1.62 | 22.9 | 63.5 |

Figure 2:
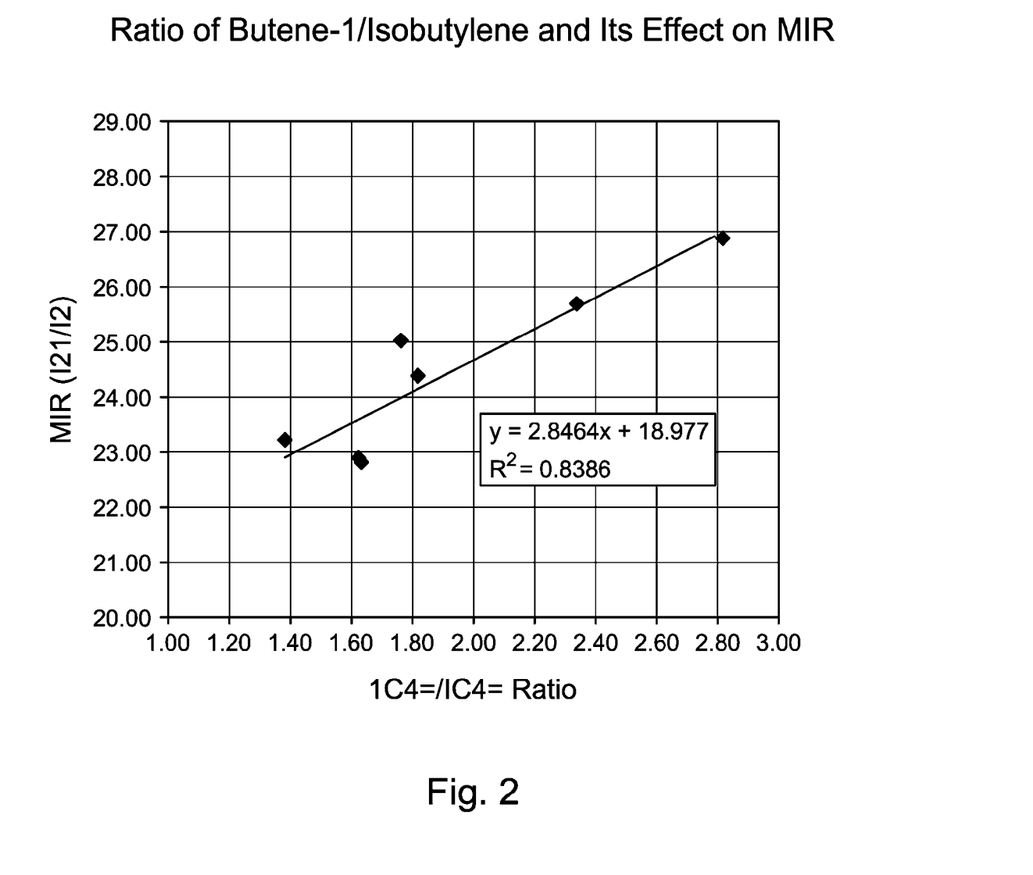
FIG. 2 illustrates a correlation between the ratio of butene-1 (1C4=):isobutylene (IC4=) in the lean phase and the resulting Melt Index Ratio of an ethylene-butene copolymer.
Figure 3:
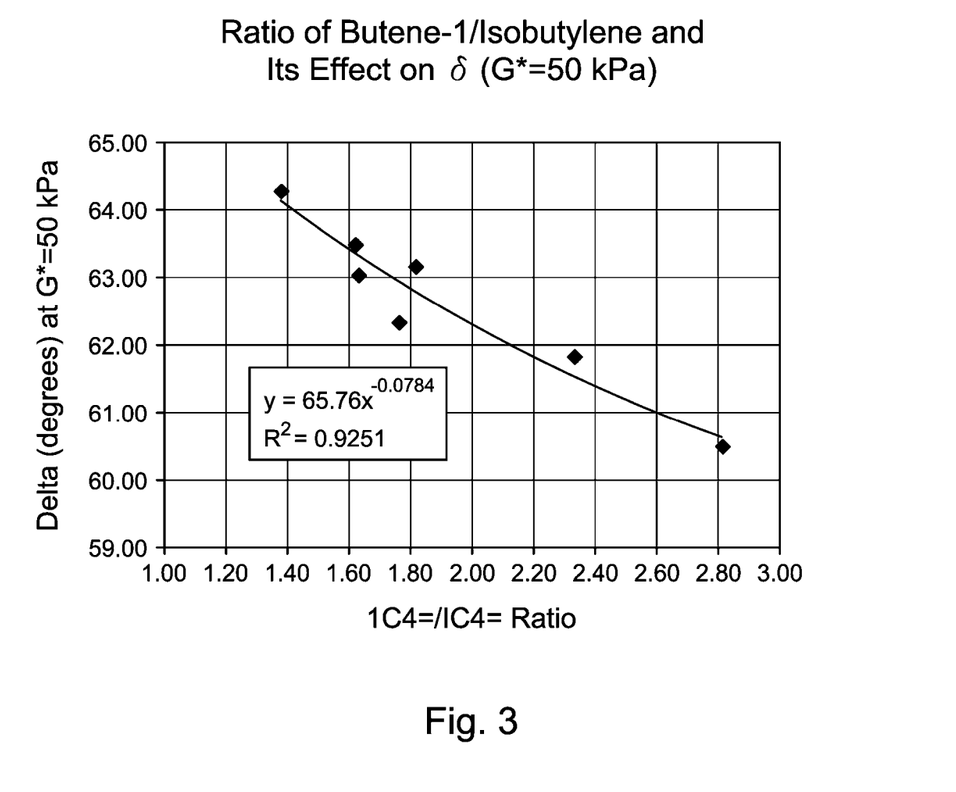
FIG. 3 illustrates a correlation between the ratio of butene-1:isobutylene in the lean phase and the resulting phase angle of an ethylene-butene copolymer.

The relationship between the ratio of butene-1:isobutylene and Melt Index Ratio is plotted in FIG. 2, which suggests that the greater the amount of butene-1 compared to isobutene, the higher the MIR and thus greater long chain branching. In other words, the more isobutene present relative to butene-1, the lower the MIR and thus more linear the ethylene-butene copolymer is expected to be. A similar correlation is shown in FIG. 3 using phase angle $\delta$ as an indicator for the degree of branching. The more isobutene present relative to butene-1, the higher the $\delta$, and thus less long chain branching and more linear the ethylene-butene copolymer is expected to be.

Figure 4:
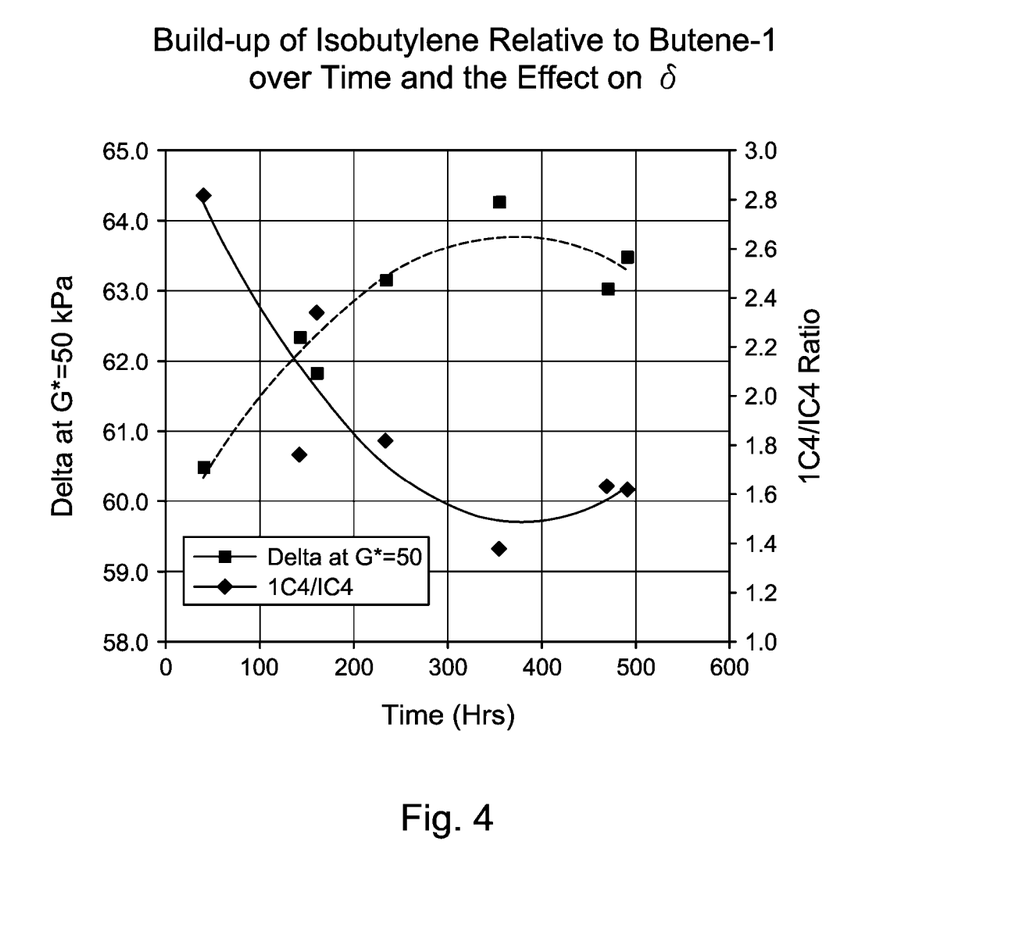
FIG. 4 illustrates the buildup of isobutylene over time as it is recycled back to the reactor and purged, and the effect of isobutylene buildup on phase angle.

FIG. 4 illustrates the buildup of isobutylene over time as it is recycled back to the reactor (the dip at 360 hours indicates removal of isobutylene), and the effect of isobutylene buildup on $\delta$. As the butene-1:isobutylene ratio decreases with isobutylene buildup, $\delta$ increases, i.e., the ethylene-butene copolymer becomes more linear.

Figure 5:
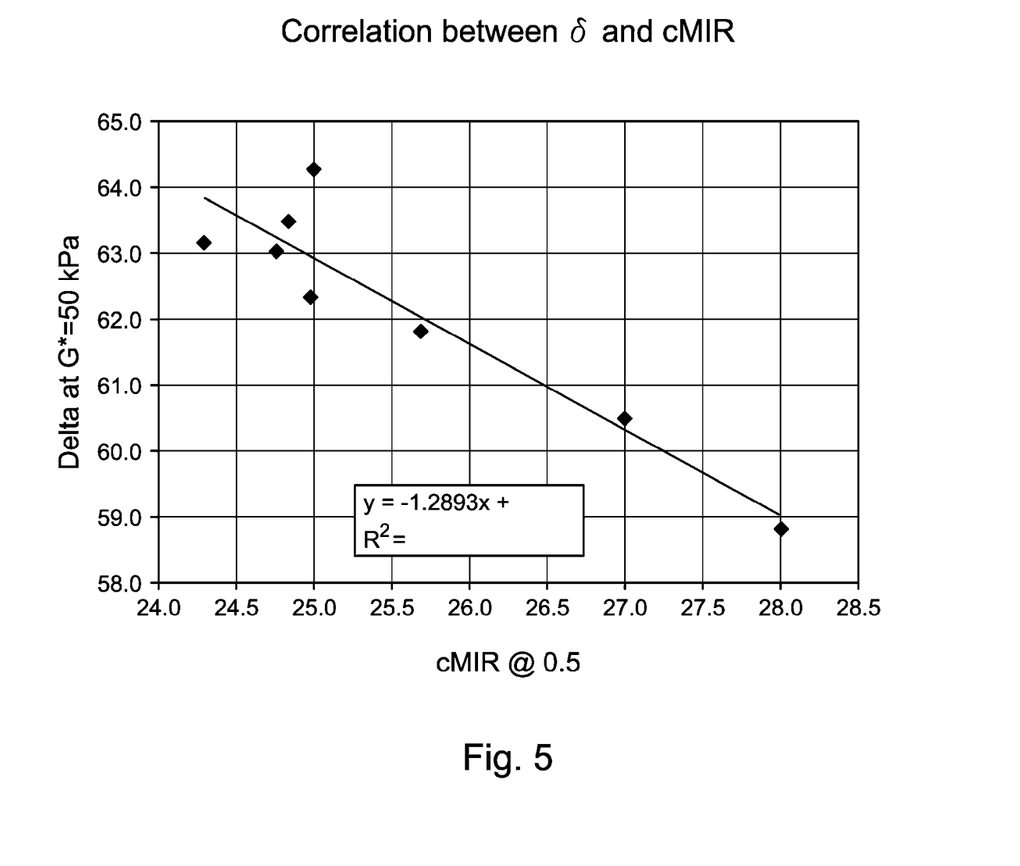
FIG. 5 illustrates a correlation between corrected MIR (cMIR) and phase angle ($\delta$).

FIG. 5 illustrates the relationship between cMIR and $\delta$. Based on the equation below, raw MIR data at a given measured MI can be converted to a corrected MIR (cMIR) at a defined target MI, using the MI exponent in this equation. Such a correction eliminates the dependence of MIR on MI, and the cMIR that results is a more accurate indicator of long chain branching similar to $\delta$.

$$36 \times MI^{-0.038} \times R_C^{0.076} \times R_h^{-0.037} \leq MIR \leq 44 \times MI^{-0.038} \times R_C^{-0.076} \times R_h^{-0.037}$$

where MI is Melt Index (190° C./2.16 kg);

$R_C$ is the ratio by weight of the other $C_4$ components to ethylene in the lean phase multiplied by 1000; and $R_h$ is the ratio by weight of hydrogen to ethylene in the reactor feed multiplied by 1,000,000.

The effect of long chain branching on physical properties of the polymers is illustrated in Table 2, which compares MIR and $\delta$ with stress and strain properties of the polymer.

TABLE 2

MIR and $\delta$ and Related Properties

| Ex. | Density | MI | MIR ($MI_{21.6}/MI$) | $\delta$ $\lvert G^*\rvert = 50$ kPa | Stress @ 100% strain, psi | Stress @ break, psi | Stress @ break % |
|---|---|---|---|---|---|---|---|
| Exact 4049 | 0.877 | 3.93 | 19.8 | 68.9 | 326 ± 12 | 573 ± 65 | 1608 ± 260 |
| 5 | 0.873 | 4.58 | 25.0 | 61.2 | 276 ± 5 | 324 ± 14 | 1167 ± 97 |
| 6 | 0.874 | 4.57 | 24.1 | 63.5 | 301 ± 16 | 387 ± 21 | 1183 ± 83 |

All patents and patent applications, test procedures (such as ASTM methods, UL methods, and the like), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The invention claimed is:

1. A method for controlling a property of an ethylene-butene copolymer, said method comprising:
   (a) establishing a target property level for an ethylene-butene copolymer;
   (b) contacting ethylene, butene-1, and isobutylene with a catalyst to form a polymerization mixture in a reaction zone;
   (c) controlling the amount of isobutylene relative to butene-1 in the reaction zone; and
   (d) forming an ethylene-butene copolymer having the target property level.

2. The method of claim 1, wherein step (c) comprises:
   (i) separating the polymerization mixture into a concentrated phase and a lean phase, wherein the lean phase comprises isobutylene;
   (ii) controlling the amount of isobutylene in the lean phase to effect the target property level; and
   (iii) recycling at least a portion of the lean phase containing isobutylene to the reaction zone.

3. The method of claim 2, wherein step (ii) comprises determining the amount of isobutylene in the lean phase, and adjusting the amount of isobutylene in the lean phase.

4. The method of claim 1, wherein step (c) comprises determining the amount of isobutylene in the reaction zone, and adjusting the amount of isobutylene in the reaction zone.

5. The method of claim 1, wherein step (c) comprises adding fresh isobutylene to the reaction zone.

6. The method of claim 1, wherein the property is at least one of long chain branching and Melt Index Ratio.

7. The method of claim 2, wherein the amount of isobutylene relative to the amount of butene-1 is controlled such that the ethylene-butene copolymer has at least one of:

a Melt Index Ratio (MIR) value (at $MI_{21.6}/MI$) meeting the following equation:

$$2.85 R_B + 17 \leq MIR \leq 2.85 R_B + 21;\text{ and}$$

(ii) a phase angle δ (at $|G^*|=50$ kPa) meeting the following equation:

$$63.8(R_B^{-0.0784}) \leq \delta \leq 67.8 (R_B^{-0.0784}),$$

where $R_B$ is the ratio by weight of butene-1 to isobutylene in the lean phase.

8. The method of claim 1, wherein the ethylene-butene copolymer comprises butene in an amount of about 10 wt % to about 50 wt %.

9. The method of claim 1, wherein the ethylene-butene copolymer has a weight average molecular weight of about 50,000 to about 500,000.

10. The method of claim 1, wherein the ethylene-butene copolymer has a Melt Index (190° C./2.16 kg) of about 0.1 to about 100 g/10 min.

11. The method of claim 1, wherein the ethylene-butene copolymer has a density of about 0.850 to about 0.905 g/cm³.

12. The method of claim 1, wherein the catalyst is 1,1'-bis(4-triethylsilylphenyl)methylene-(cyclopentadienyl)(2,7-di-tertiary-butyl-9-fluorenyl)hafnium dimethyl.

13. The method of claim 1, further comprising contacting with a co-catalyst in step (b), wherein the co-catalyst is at least one of dimethylanilinium-tetrakis(pentafluorophenyl)borate and dimethylaniliniumtetrakis(heptafluoro-napthyl)borate.

14. A method for controlling a property of an ethylene-butene copolymer, said method comprising:
(a) establishing a target property level for an ethylene-butene copolymer;
(b) contacting ethylene, butene-1, and other $C_4$ components with a catalyst to form a polymerization mixture in a reaction zone;
(c) controlling the amount of other $C_4$ components relative to ethylene in the reaction zone; and
(d) forming an ethylene-butene copolymer having the target property level.

15. The method of claim 14, wherein step (c) comprises:
(i) separating the polymerization mixture into a concentrated phase and a lean phase, wherein the lean phase comprises other $C_4$ components;
(ii) controlling the amount of the other $C_4$ components in the lean phase to effect the target property level; and
(iii) recycling at least a portion of the lean phase containing the other $C_4$ components to the reaction zone.

16. The method of claim 15, wherein step (ii) comprises determining the amount of other $C_4$ components in the lean phase, and adjusting the amount of the other $C_4$ components in the lean phase.

17. The method of claim 14, wherein the property is at least one of long chain branching and Melt Index Ratio.

18. A method for controlling a property of a thermoplastic polyolefin composition comprising an ethylene-butene copolymer, said method comprising:
(a) establishing a target property level for a thermoplastic polyolefin composition comprising an ethylene-butene copolymer, wherein the property is at least one of (i) flexural modulus; (ii) stiffness; (iii) impact resistance; (iv) average particle size of the ethylene-butene copolymer in the thermoplastic polyolefin composition; and (v) particle size distribution of the ethylene-butene copolymer in the thermoplastic polyolefin composition;
(b) contacting ethylene, butene-1, and isobutylene with a catalyst to form a polymerization mixture in a reaction zone;
(c) controlling the amount of isobutylene relative to butene-1 in the reaction zone to effect the target property level for the thermoplastic polyolefin composition; and
(d) forming the ethylene-butene copolymer.

19. The method of claim 18, wherein step (c) comprises:
(i) determining the amount of isobutylene in the reaction zone;
(ii) forming an ethylene-butene copolymer;
(iii) forming a thermoplastic polyolefin composition comprising the ethylene-butene copolymer;
(iv) determining the property level of the thermoplastic polyolefin composition of step (iii); and
(v) adjusting or maintaining the amount of isobutylene relative to butene-1 in the reaction zone based on the property level determined in step (iv) to effect the target property level.

20. A method for controlling a property of an ethylene-butene copolymer, said method comprising:
(a) establishing a target property level for an ethylene-butene copolymer;
(b) contacting ethylene, butene-1, and isobutylene with a catalyst to form a polymerization mixture of ethylene-butene copolymer in a reaction zone;
(c) determining the property level of a sample of the ethylene-butene copolymer;
(d) adjusting the amount of isobutylene relative to butene-1 in the reaction zone based on the property level from step (c); and
(e) obtaining ethylene-butene copolymer having the target property level, wherein steps (c)-(d) are optionally repeated until the target property level is obtained.

* * * * *